United States Patent [19]

Durboraw, III

[11] Patent Number: 5,119,504
[45] Date of Patent: Jun. 2, 1992

[54] POSITION AIDED SUBSCRIBER UNIT FOR A SATELLITE CELLULAR SYSTEM

[75] Inventor: Isaac N. Durboraw, III, Scottsdale, Ariz.

[73] Assignee: Motorola, Inc., Schaumburg, Ill.

[21] Appl. No.: 554,657

[22] Filed: Jul. 19, 1990

[51] Int. Cl.⁵ .................... G01S 5/02; H04B 7/185
[52] U.S. Cl. .................... 455/54.1; 340/991; 342/357; 364/449; 455/89; 455/13.2
[58] Field of Search .................... 362/357, 457; 455/12, 455/13, 75, 76, 54, 88, 89, 67; 340/991, 988; 342/352, 450, 458, 463; 370/404.1; 364/449, 459

[56] References Cited

U.S. PATENT DOCUMENTS

| | | | |
|---|---|---|---|
| 4,520,474 | 5/1985 | Vilmur | 370/24 |
| 4,627,099 | 12/1986 | Shimakata | 455/76 |
| 4,672,382 | 6/1987 | Fukuhara et al. | 342/357 |
| 4,731,613 | 3/1988 | Endo et al. | 342/357 |
| 4,897,642 | 1/1990 | DiLullo et al. | 455/54 |
| 4,899,285 | 2/1990 | Nakayama et al. | 364/453 |
| 4,918,609 | 4/1990 | Yamawaki | 364/449 |
| 4,932,072 | 6/1990 | Toko | 455/76 |

OTHER PUBLICATIONS

Article entitled, "Principle of Operation of NAVSTAR and System Characteristics", Milliken et al, Global Positioning System by the Institute of Navigation, 1990.

Primary Examiner—Reinhard J. Eisenzopf
Assistant Examiner—Chi H. Pham
Attorney, Agent, or Firm—Frank J. Bogacz; Jordan C. Powell

[57] ABSTRACT

A subscriber unit for communicating with a satellite communication system. This subscriber unit receives and transmits digital data from satellites of a satellite communication system. In addition, the subscriber unit self-determines its own position and transmits this position to the satellites of the satellite communication system. In this way, the satellite communication sytem knows the position of each subscriber unit so that communications may be established more efficiently. In addition, the position of the subscriber unit is automatically determined from the received GPS signals and reported to the satellite communication system for other uses such as asset management and search and rescue operations.

10 Claims, 1 Drawing Sheet

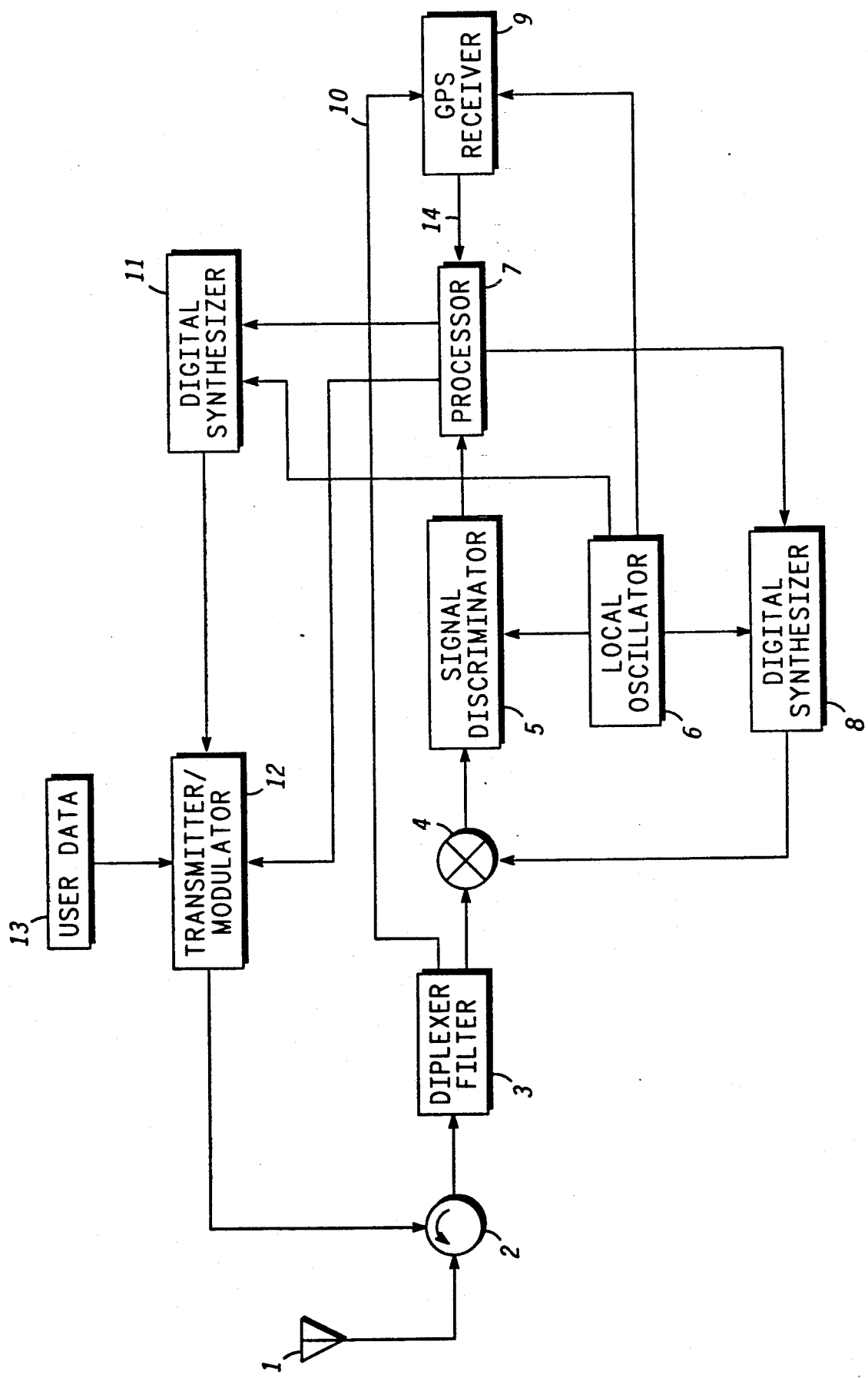

5,119,504

POSITION AIDED SUBSCRIBER UNIT FOR A SATELLITE CELLULAR SYSTEM

CROSS-REFERENCE TO RELATED APPLICATIONS

The present case is related to co-pending U.S. applications Ser. No. 263,849 abandoned; Ser. No. 402,743 abandoned which has the same inventive entity as the present application; Ser. No. 415,814 abandoned; Ser. No. 415,842 pending; Ser. No. 415,815 pending; and Ser. No. 414,494 pending all being assigned to the same assignee as the present invention.

BACKGROUND OF THE INVENTION

The present invention pertains to portable communication devices and more particularly to a position aided, portable communication device for use with a satellite communication system.

When achieving communication between satellites and users of a satellite communication system around the world, knowledge of the location of each user is important to establishing and maintaining the communication link. Knowledge of the location of a particular user is also important because that location information may be reported through the satellite link which serves the user to any other user worldwide. A single unit which combines voice/data communication and precise location determination has several advantages over the present day communication system devices. Applications of such a system include asset management as well as coordination of activities of search and rescue and various military operations.

Since communications of the user unit to satellites involve frequent hand-offs between cells created by individual satellites and between adjacent satellites, the knowledge of precise location of both the user unit and of the satellites can be used to efficiently determine an appropriate hand-off strategy.

Further, precise knowledge of the location of a user unit also aids in the acquisition process by permitting precise correction for Doppler and reference frequency induced errors. The satellites of a low-earth orbit satellite communication system such as Iridium move very rapidly compared with the location of a user on earth. During communications, the system must provide Doppler compensation to the signals to compensate for the rapidly changing propagation delay in the link. During acquisition of the signals, if the user unit cannot independently determine the Doppler frequency, an exhaustive frequency search of the Doppler range must be performed. This length of time for an exhaustive search would delay the recognition of the user by the system. Therefore, in the case of telecommunication, the user would experience a delay in being able to establish communications.

However, the communication satellite ephemerides can be stored in the user unit and will remain valid for several days. Within knowledge of the precise location of the user unit, the Doppler adjustment as well as the correction to the reference oscillator can be explicitly computed. This would permit more rapid acquisition and tracking of the satellite pilot channel.

Accordingly, it is an object of the present invention to provide a combined position aided voice/data communicator device for use with a satellite communication system.

SUMMARY OF THE INVENTION

In accomplishing the object of the present invention, a novel position aided voice/data subscriber unit for a satellite cellular system will be shown.

A satellite communication system includes a number of subscriber units, each subscriber unit for receiving and transmitting digital data. In addition, each subscriber unit self-determines its position.

The subscriber unit includes a receiver/transmitter for receiving from and transmitting to a satellite of the satellite communication system digital user data. In addition, the subscriber unit includes a receiver for self-determining the position of the subscriber unit and transmitting that position to the satellite of the satellite communication system.

The above and other objects, features, and advantages of the present invention will be better understood from the following detailed description taken in conjunction with the accompanying drawings.

BRIEF DESCRIPTION OF THE DRAWINGS

The single sheet of drawings included herewith is a block diagram of a combined position aided subscriber unit for a satellite cellular system.

DESCRIPTION OF THE PREFERRED EMBODIMENT

The disclosure of co-pending U.S. patent applications Ser. Nos. 263,849; 402,743; 415,814; 415,842; 415,815; and 414,494 are hereby incorporated by reference.

Referring to the single sheet of drawings included herewith, antenna 1 is shown. Antenna 1 receives information from a global positioning system (GPS), not shown, as well as information transmitted from the satellites of a satellite communication system (not shown). In addition, antenna 1 operates to transmit voice and data information from the subscriber to the satellite communication system.

Antenna 1 is connected to circulator 2 which provides isolation between the transmitted and the received signals. Circulator 2 operates such that the incoming signals received from antenna 1 are transmitted to diplexer filter 3 and outgoing signal from transmitter/modulator 12 is transmitted from transmitter/modulator 12 to antenna 1 for outgoing transmission.

Diplexer filter 3 is connected to circulator 2. Diplexer filter 3 includes amplification and operates to pass both the GPS signals and satellite transmitted signals for subsequent processing. Diplexer 3 is further connected to mixer 4 and to GPS receiver 9 via path 10.

Since the GPS information as well as the transmissions from the satellite are in the same frequency band, they must be separated for processing by the communication system.

The output of mixer 4 is connected to signal discriminator 5. Signal discriminator 5 separates the satellite communication signals from all other signals received by the system. The satellite communication signals are in the L-band which is approximately 1.5 to 1.6 GHz. Signal discriminator 5 strips data from the carrier after determining the appropriate tracking code.

Local oscillator 6 is connected to signal discriminator 5, to digital synthesizer 8 and to GPS receiver 9. Local oscillator 6 is a reference frequency source. Signal discriminator 5 detects a reference clock error and is connected to processor 7 analogous to a phase lock loop. Such error is interpreted by the processor to adjust the Digital Synthesizer Frequency in such a manner to maintain phase with the signal modulation. Processor 7 is connected to digital synthesizer 8 and digital synthesizer 8 is connected to mixer 4 in a feedback loop configuration. Data transmitted from the satellite is sent at 2 millisecond bursts (approximately 14 MHz data stream) at a 30 millisecond rate. The signal discriminator 5 is based on bit correlation and recognizes a predetermined header pattern. Information following the header is the desired communication information transmitted by the satellite system.

The signal discriminator transmits bits of information representing the communication information to processor 7. Processor 7 derives a measure of the phase error which is the difference in phase between the bits of the predetermined header pattern synthesized in the synthesizer and the corresponding bits modulated on the satellite signal. As a result, processor 7 determines whether the bits are being received early or late and adjusts digital synthesizer 8 to transmit an adjusted reference signal to mixer 4 for synchronizing receipt of the satellite communication information. Processor 7 determines the adjustment input to the digital synthesizer 8 from the nominal reference of the local oscillator 6. Since there is rapid movement of the satellites of the communication system, the received signals at L-band may vary over a range of approximately 70 KHz. Local oscillator 6 has an additional 3 KHz uncertainty as well. Compensation for these variations are performed by adjustment in the digital synthesizer 8 which account for each of these variations of the signals and the local oscillator.

The processor 7 would obtain measurements from the signal discriminator 5 while it is demodulating the data from the communication link that would alter the reference signal frequency provided by the local oscillator 6 so that the input signal to the mixer 4 would perfectly match the received signal frequency output from the diplexer 3 and input to mixer 4. The offset frequency so derived by the processor 7 and commanded to the signal synthesizer 8 is mathematically represented as a sum of the reference frequency error and the Doppler shift frequency signal from the communication satellite system (not shown) to the receiver antenna 1.

GPS signals received from the global positioning system satellites are received by antenna 1 and transmitted through circulator 2 and through diplexer 3 to GPS receiver 9 via connection 10. The GPS system includes a group of at least four satellites from which time and location information may be derived. From this time and location information, a GPS receiver may calculate its own position. GPS receiver 9 operates upon the data received via antenna 1, circulator 2, and diplexer filter 3 to perform these functions for the subscriber unit. The GPS satellites are in 12-hour orbits at approximately 22,000 kilometers above the earth. GPS receiver 9 determines a pseudo range for each of the four satellites of the GPS system. GPS receiver 9 then accurately calculates the coordinates of the corresponding subscriber unit. The processor 7 has stored in an associated memory all the ephemerides of the satellites of the communication system. As a result, processor 7 knows which satellite is overhead and at which time to initiate a message transmission to the satellite so that it will fall into an appropriate Time Division Multiple Access time slot of the satellite receiver. Also, the processor 7 must adjust the signal for Doppler effects, which are attributed to the satellite's motion relative to the user during the interval of communication.

The GPS receiver 9 tracks the signal from the GPS satellites appearing in the signal output from diplexer filter 3. These measurements together with the reference of the local oscillator 6 define the true error in the reference frequency defined by the local oscillator 6. The processor 7 uses this estimate of the true error in reference frequency to compensate the above-derived offset frequency and defined the Doppler correction uplink frequency from the local oscillator 6 using the digital synthesizer 11 and the transmitter/modulator 12 for transmission to the communication system via antenna 1. This signal will be at a standard frequency independent of the Doppler effect of relative motion of the satellite with respect to the terrestrial user unit. By using the GPS receiver 9 for defining a precise reference frequency, the downlink Doppler shift can be distinguished from the effect of the receiver local oscillator 6 offset and is then used to synthesize a Doppler compensated signal for the uplink.

Processor 7 is connected to digital synthesizer 11. Digital synthesizer 11 is connected to transmitter/modulator 12. Transmitter/modulator 12 is connected to circulator 2. User data 13 in the form of digital voice or digital data is supplied to the transmitter/modulator 12 by the user.

At the appropriate time in the telecommunications transmission, processor 7 will provide position information for including in the modulated signal format that is generated by the transmitter/modulator 12. Transmitter/modulator 12 will convert the data to analog signals and transmit it through circulator 2, to antenna 1 where it will be output and transmitted to the appropriate satellite.

Once the telecommunication link has been established between the subscriber device and satellite, user data 13 is transmitted to transmitter/modulator 12 for transmission to the satellite in the appropriate time slot. Under the control of processor 7, digital synthesizer 11 provides a carrier waveform having the appropriate frequency, properly Doppler compensated and time synchronized at the satellite receiver. As a result, the satellite receives a string of data being sent from a plurality of users each having their respective information in the appropriate time slot.

The previously described subscriber unit for a satellite communication system provides the following advantages. First, automatic worldwide tracking of a satellite user may be accomplished via the subscriber unit. This function is important for applications which keep track of a specified element or person that is using the satellite communication system. The primary use, of course, for the location detection by the subscriber unit is for the communication system itself. Without such information, the system would have to search over the entire world to find a user. However, by reporting in occasionally, the subscriber unit lets the system know where it is so that the system resources may be used more efficiently when a call comes to that particular user.

Second, improved efficiency of each subscriber unit is achieved by the fast acquisition of the satellite pilot channel. However, prior to tracking this signal, the subscriber unit must be able to correct for Doppler effects caused by the motion of the high-speed satellites relative to the user. By "remembering" the satellite system's ephemerides, the subscriber unit can predict the signals from each of the satellites and thus acquire the signals more quickly than if search methods were employed. In addition, uplink synchronization may be aided by knowledge of range to the satellite. This information can be immediately processed with knowledge of both the satellite's position and the subscriber unit's position.

Third, call hand-offs between cells of a particular satellite or between satellites are dependent upon knowledge of position of the user relative to the satellite locations. This information can be explicitly determined from knowledge of the subscriber unit's position and the satellite's position. The communication satellite position can be computed from stored ephemerides of the satellites which are acquired from earth-based systems to which the satellites communicate and transmitted to the user units along with other data on the downlink. Precise time is available on the satellites of the communication system through the use of Rubidium reference clocks onboard each satellite. The subscriber unit position would be available as a primary output of the GPS receiver that is built in to the subscriber unit.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a satellite communication system, a subscriber unit for receiving and for transmitting digital data and for self-determining the location of said subscriber unit, said subscriber unit comprising:
   means for receiving from and transmitting to a satellite of said satellite communication system digital user data;
   said means for receiving and transmitting including transmitter/receiver means coupled to a plurality of satellites of said satellite communication system and coupled to a plurality of satellites of a global positioning system to receive location information from said global positioning system to receive and to transmit digital data to and from said satellites of said satellite communication system; and
   means for self-determining said location of said subscriber unit from said location information of said global positioning system and for transmitting said location of said subscriber unit to said satellite communication system, said means for self-determining being coupled to said transmitter/received means.

2. A subscriber unit as claimed in claim 1, wherein said transmit/receive means includes:
   antenna means coupled to said plurality of satellites of said satellite communication system and coupled to said plurality of said satellites of said global positioning system; and
   circulator means connected to said antenna means for transmitting signals simultaneously as signals are received from said plurality of said satellites of said global positioning system.

3. A subscriber unit as claimed in claim 2, wherein said transmit/receive means further includes:
   filter means connected to said circulator means, said filter means transmitting those signals in particular frequency ranges of signals transmitted by said satellites of said satellite communication system and of said satellites of said global positioning system; and
   mixer means connected to said filter means, said mixer means for multiplying said signals received from said satellite of said satellite communication system.

4. A subscriber unit as claimed in claim 3, wherein said means for receiving and transmitting further includes means for recovering said digital data from said signals of said satellite communication system, said means for recovering being connected to said mixer means.

5. A subscriber unit as claimed in claim 4, wherein said means for recovering further includes:
   signal discriminator means connected to said mixer means, said signal discriminator means for determining a plurality of bits representing communication information of said satellite communication system;
   processor means connected to said signal discriminator means, said processor means operating to recover and store said communication information;
   digital synthesizer means connected between said processor means and said mixer means, said digital synthesizer means operating to adjust said mixer means to synchronize said reception of said signals of said satellite communication system; and
   local oscillator means connected to said signal discriminator means and to said digital synthesizer means, said local oscillator means for providing a reference signal of a particular frequency.

6. A subscriber unit as claimed in claim 5, wherein said means for self-determining includes GPS receiver means connected to said processor means, said local oscillator means, and to said filter means, said global positioning system receiver means operating in response to said signals of said satellites of said global positioning system to determine said location of said subscriber unit and to transmit said location to said processor means.

7. A subscriber unit as claimed in claim 6, wherein said means for receiving and transmitting further includes transmit means connected between said processor means and said circulator means, said transmit means operating to send digital data representing user data and digital data representing said location of said subscriber unit.

8. A subscriber unit as claimed in claim 7, wherein said transmit means includes:
   transmitter/modulator means connected to said circulator means;
   second digital synthesizer means connected to said local oscillator means, to said processor means and to said transmitter/modulator means; and
   said processor means synchronizing the transmission of said user data and said location information via said digital synthesizer means and said transmitter/modulator means to a particular TDMA satellite time slot.

9. A subscriber unit as claimed in claim 8, wherein there is further included means for generating user data, said means for generating user data connected to said transmitter/modulator means, said transmitter/modulator means operating to control the transmission of said user data through said circulator means to said antenna means.

10. In a satellite communication system, a subscriber unit for receiving and for transmitting digital data and for self-determining the location of said subscriber unit, said subscriber unit comprising:

means for receiving from and transmitting to a satellite of said satellite communication system digital user data;

said means for receiving and transmitting further operating to receive digital data from a plurality of satellites of a global positioning system;

means for recovering the user data transmitted by said satellite of said satellite communication system;

global positioning system receiver means for self-determining said location of said subscriber unit from said digital data of said satellites of said global positioning system and for transmitting said location of said subscriber unit to said satellite of said satellite communication system; and means for transmitting digital user data from said subscriber unit to said satellite of said satellite communication system.

* * * * *